United States Patent
Lee (10) Patent No.: US 7,187,669 B1
(45) Date of Patent: Mar. 6, 2007

(54) CONTENTION MANAGEMENT TECHNIQUES FOR RESERVATION-BASED TDMA SYSTEMS

(75) Inventor: Chung-Chieh Lee, Long Grove, IL (US)

(73) Assignee: Juniper Networks, Inc., Sunnyvale, CA (US)

( * ) Notice: Subject to any disclaimer, the term of this patent is extended or adjusted under 35 U.S.C. 154(b) by 1072 days.

(21) Appl. No.: 10/264,179

(22) Filed: Oct. 3, 2002

(51) Int. Cl.
*H04B 7/212* (2006.01)

(52) U.S. Cl. .................. 370/347; 370/442; 370/448
(58) Field of Classification Search ............ None
See application file for complete search history.

(56) References Cited

U.S. PATENT DOCUMENTS

| | | | |
|---|---|---|---|
| 6,529,520 B1 * | 3/2003 | Lee et al. ............ | 370/442 |
| 2003/0103527 A1 * | 6/2003 | Beser ................ | 370/468 |
| 2006/0050689 A1 * | 3/2006 | Rabenko et al. ........ | 370/356 |

OTHER PUBLICATIONS

Boutros, Joseph et al. "Design and Performance of a Fully-digital DOCSIS CMTS Receiver", pp. 1-18, NCTA and Juniper Networks, Inc. 2002.

* cited by examiner

*Primary Examiner*—Duc Ho
(74) *Attorney, Agent, or Firm*—Shumaker & Sieffert, P.A.

(57) ABSTRACT

The invention is directed to techniques for improving upstream communication in a DOCSIS-based cable network or other reservation-based TDMA system. In one example, the techniques may involve dynamically adjusting the size of a contention region in a MAP interval in which upstream time slot allocation is conveyed by a MAP message broadcasted by a cable modem transmission system (CMTS) to cable modems (CMs) sharing a common upstream DOCSIS channel. By adjusting the size of the contention region in the MAP intervals based on measured traffic parameters, the system can be dynamically responsive to different upstream traffic scenarios and thereby exploit maximal upstream data throughput continually.

39 Claims, 7 Drawing Sheets

CONTENTION MANAGEMENT TECHNIQUES FOR RESERVATION-BASED TDMA SYSTEMS

FIELD

The invention relates to cable networks configured to support packet-based data communication, and other time division multiple access (TDMA) systems that utilize reservation-based medium access techniques.

BACKGROUND

Cable networks were originally developed to facilitate the distribution of television broadcasts. Cable networks generally use coaxial cables as transmission lines for the dissemination of television broadcasts to various homes, businesses and the like. Cable networks were designed to support one-way communication of broadcast signals from a broadcast center to a number of television nodes connected to the cable network.

The "Internet" is a well-known term that refers to collection of data networks that utilize layered protocols to route data packets to various locations around the world. Internet carries and processes data traffic in internet protocol IP packets each of which contains source and destination IP addresses, and other control information, along with a segment of user data (sometimes referred to as the payload). As such, computers use the Internet to communicate data in IP packets and receive and process IP packets in accordance with the protocol.

The emergence of the Internet has prompted the desire to allow cable networks to support two-way packet-based data communication. This desire has resulted in standards and protocols that enable network infrastructure conventionally used for the distribution of cable television broadcasts to deliver Internet service to homes, businesses and the like. By adding the two-way packet based communication capability, cable networks can now support both one way communication of cable television broadcasts, and two-way packet based voice and data communication.

In order to allow a cable network to offer Internet access to cable subscribers in a bandwidth-efficient manner, the Cable Television Laboratories (CableLab) has developed a series of Data Over Cable System Interface Specification (DOCSIS) standards that govern the design of cable modems (CMs) residing in subscribers' premises, and of cable modem termination systems (CMTSs) deployed and managed by the cable operator. The network that interconnects the CMs to a CMTS is called the cable access network or DOCSIS network, which may physically consist of coaxial cables and optical fibers, and other transmission equipments, such as lasers and amplifiers, in the cable plant which is commonly referred to as Hybrid Fiber-Coax (HFC) network.

For a cable subscriber to communicate over the Internet, it uses a DOCSIS-compliant CM to interface with the DOCSIS network. As the gateway to the Internet, the CMTS controls the access of the CM to the bandwidth resources of the DOCSIS network. Although a coaxial cable has a usable RF spectrum in excess of 500 MHz, most of this spectrum is used for broadcasting TV programs. Accordingly, only a small portion is typically allocated to transport data via the DOCSIS network. Current versions of DOCSIS include DOCSIS 1.0, DOCSIS 1.1 and DOCSIS 2.0. Future releases of DOCSIS may continue to evolve to improve the two-way packet based communication and may entail more RF bandwidth for such services.

One challenge in DOCSIS and similar protocols, such as the wireless counterpart to DOCSIS that enables two-way packet based communication over a shared RF access medium, is the control and management of upstream communication. In this disclosure, the phrase "upstream communication" refers to communication from a CM to a CMTS. "Downstream communication" on the other hand, refers to communication from the CMTS to the CMs. A DOCSIS network may have several upstream channels and several downstream channels, each using a unique RF spectrum that does not conflict with other channels. The CMTS implements a scheduler to control each respective channel.

Controlling upstream communication is much more challenging than coordinating downstream communication because the CMs are independent from one another and compete for the upstream bandwidth. In contrast, the CMTS is generally the only device that transmits on the downstream channel. To facilitate upstream communication, the upstream scheduler dynamically assigns upstream time slots to individual CMs for transmission of their waiting packets. For the most part, the DOCSIS standards leave the design of the upstream scheduler flexible, i.e., the CMTS vendor is free to design its own upstream scheduler subject to certain general requirements. As a result, the quality of the upstream scheduler is a key determining factor for the upstream bandwidth efficiency of an CMTS.

Each CM is typically associated with one or more computers in a home or business that subscribes to Internet access through a DOCSIS network. Serving as a control interface between the CMs and the internet, the CMTS coordinates communication between various server computers attached to the Internet and subscriber computers equipped with the CMs. The CMTS directs data between the Internet and various CMs connected to the CMTS.

Upstream communication is supported in DOCSIS via a reservation-based time division multiple access (TDMA) protocol. In particular, the protocol requires that a CM make a time-slot reservation to transmit every single upstream data packet on the upstream channel. After obtaining a reservation, the CM can transmit the data packet during the reserved time slots. Such a reservation-based system can avoid data packets from being sent from different CMs at the same time, in which case the data packets sent from the different CMs would collide on the common upstream channel of the cable transmission line and thereby undermine the ability of the CMTS to receive the packets.

Central to the upstream time slot reservation mechanism is the "MAP" and the "MAP interval." A MAP is an upstream channel control message broadcasted over the downstream channel by the CMTS on a regular basis in order to inform the CMs sharing a common channel of their reservation status and of the allocation of upstream time slots for the CMs to transmit time slot requests. In this disclosure, the term "TDMA map" refers to a MAP, or similar message in a non-DOCSIS system. Similarly the terms "map" and "map interval" refer respectively to a MAP or a MAP interval of a DOCSIS compliant system, or similar control messages of other reservation based TDMA packet transmission systems.

In a DOCSIS network, each MAP schedules a particular future time interval in which certain CMs may be granted time slots for their upstream packet transmissions. That future time internal is the "MAP interval" associated with the given MAP. The time (commonly known as the "Advance Time" in DOCSIS) between the time a MAP is transmitted on the downstream channel and the time when the MAP interval associated with the MAP begins, must be large enough to accommodate for transmission and propagation delays, as well as processing delays of the CMs. Two successive MAPs define back-to-back MAP intervals so that the upstream channel is covered by MAP intervals seamlessly.

A MAP details the schedule of the time slots within the MAP interval. Generally, it specifies time slots within which a given CM should transmit its waiting packet on the upstream channel, i.e., a grant in response to a time-slot request. The MAP also defines time slots in which needy CMs can transmit their time-slot requests on a contention basis, and time slots that are to be used for other signaling and control purposes. In addition, a MAP also contains an "Acknowledgement" for each successful time-slot request that has not yet been granted time slots. In this disclosure, the set of time slots within a MAP interval that are dedicated to request contentions will be called "contention region" while the remaining time slots within the interval "grant region." These terms "grant region" and "contention region" have similar meanings with respect to maps or map intervals of non-DOCSIS reservation based TDMA packet transmission systems.

Transmitting a time-slot request typically uses exactly one time slot, while a grant, which is needed to transmit one data packet, typically uses many time slots. Since grants are scheduled by the upstream scheduler, packet collisions are avoided. However, time slot requests sent over the upstream channel during the defined contention region may collide with other time slot requests if two or more CMs select the same time slot for transmission of their time slot requests. In that case, the CMs schedules the retransmission of their lost time-slot requests upon receiving a subsequent MAP in which the CM expects, but does not receive either a grant or an acknowledgement for the previous time slot request. While the basic rescheduling policy is specified by DOCSIS, certain key parameter settings are left to the designer of upstream scheduler.

SUMMARY

In general, the invention is directed to techniques for improving upstream data communication in a DOCSIS network or other reservation-based TDMA packet transmission system that involves request contention. In one example, the techniques involve dynamically adjusting the size of the contention region provided in a MAP interval determined by the upstream scheduler of a CMTS. By adjusting the size of the contention region in each MAP interval, the system can be dynamically responsive to different upstream traffic scenarios. Accordingly, the number of collisions and/or the number of unused time slots within the contention region can be reduced, thereby improving upstream channel efficiency and user data throughput. Also, the size of a grant region during which data packets can be sent on the upstream channel may be managed for different traffic scenarios. The invention may be implemented in the CMTS, without imposing any changes or reconfigurations on DOCSIS-compliant CMs.

In one embodiment, a method includes selecting a size of a contention region for upstream communication, generating information defining the selected contention region, transmitting the information to a set of devices, receiving upstream communications from the set of devices, and selecting a different size of another contention region in response to the received communications. The method may be executed by a CMTS or a corresponding device that schedules upstream communication in a reservation based TDMA system.

One known technique used by DOCSIS to improve upstream channel efficiency is referred to as "piggybacking" of time slot requests. Piggybacking is used when a given CM has more data packet(s) queued when it is transmitting a packet on the upstream channel. In that case, the time slot request for the first queued packet can be piggybacked within the packet being transmitted. As a result, a CM may only need to transmit one time slot request using the contention approach. Then, upon receiving the grant of the requested time slots, it can piggyback the next time slot request for the next packet within the data packet transmitted using the grant.

In another embodiment, a method includes selecting a contention region for a map interval based on a piggyback ratio, the piggyback ratio being a ratio of a number of piggybacked time slot requests received during one or more previous map intervals relative to a total number of time slot requests received during the same period.

In another embodiment, a method includes receiving information defining a selected contention region of a map interval for transmitting upstream time slot reservations, transmitting data according to the received information and receiving different information defining a different selected contention region of a different map interval in relation to subsequent upstream communication.

In another embodiment, the invention may be directed to a device that controls upstream scheduling in a reservation based TDMA system. For example, the device can be configured to select a size of a contention region for upstream communication, generate information defining the selected contention region, transmit the information to a set of devices, receive upstream communications from the set of devices, and select a different size of another contention region in response to the received communications.

In another embodiment, the invention may be directed to an upstream scheduler for a reservation based TDMA system. For example, the upstream scheduler may comprise computer hardware, computer software, computer firmware, a digital signal processor that executes computer readable instructions, or the like. The upstream scheduler may be implemented within a CMTS to control and define upstream communication to the CMTS. In any case, the upstream scheduler can be configured to select a size of a contention region for upstream communication, generate information defining the selected contention region, transmit the information to a set of devices, receive upstream communications from the set of devices, and select a different size of another contention region in response to the received communications. If implemented in software, the invention may be directed to a computer readable medium comprising program code that can be executed in a device to control upstream scheduling as described herein.

In another embodiment, the invention may be directed to a reservation-based TDMA system comprising a first device that controls upstream scheduling in the reservation based TDMA system and a set of second devices that communicate upstream in the reservation based TDMA system. The first device and the set of second devices can be configured such that the first device selects a size of a contention region for upstream communication, generates information defining the selected contention region, and transmits the information to a set of second devices. The set of second devices may transmit upstream communications to the first device, and the first device may select a different size of another contention region in response to the received communications.

In an added embodiment, the invention provides a method that includes selecting an initial backoff window for a time division multiple access (TDMA) system according to a size of a contention region of a map interval, selecting a final backoff window for the TDMA system to be greater than or equal to an expected number of active modems, and transmitting the initial and final backoff windows to a set of devices for use in upstream communication.

The invention may be capable of providing one or more advantages. For example, the techniques described herein may be capable of increasing the upstream bandwidth available for user data in a reservation-based TDMA system. In particular, the techniques may reduce bandwidth waste due either to collisions or under-utilized contention regions on the upstream channel and possibly reduce the access times for a given CM to be granted time slots for upstream packet transmission. Such improved upstream communication may be particularly useful as subscribers utilize more bandwidth for upstream communication. Upstream bandwidth usage may continue to grow with the emergence and growth of interactive Internet applications such as interactive gaming, file sharing, and the like. Another advantage of the invention is transparency to DOCSIS compliant CMs. Accordingly, upstream bandwidth efficiency can be improved without the need to modify DOCSIS-compliant CMs.

These and other techniques described herein may be executed by a CMTS in a DOCSIS network or a corresponding device that controls upstream scheduling of a reservation based TDMA network. The techniques may be implemented in hardware, software, firmware, or any combination thereof. Various embodiments may be directed to the CMTS in a DOCSIS-based cable network, or its counterpart in a wireless or other reservation based TDMA access networks. For some software embodiments, the techniques may be embodied on a computer readable medium comprising program code, that when executed, performs one or more of the techniques. Additional details of various embodiments are set forth in the accompanying drawings and the description below. Other features, objects and advantages will become apparent from the description and drawings, and from the claims.

DETAILED DESCRIPTION

Figure 1:
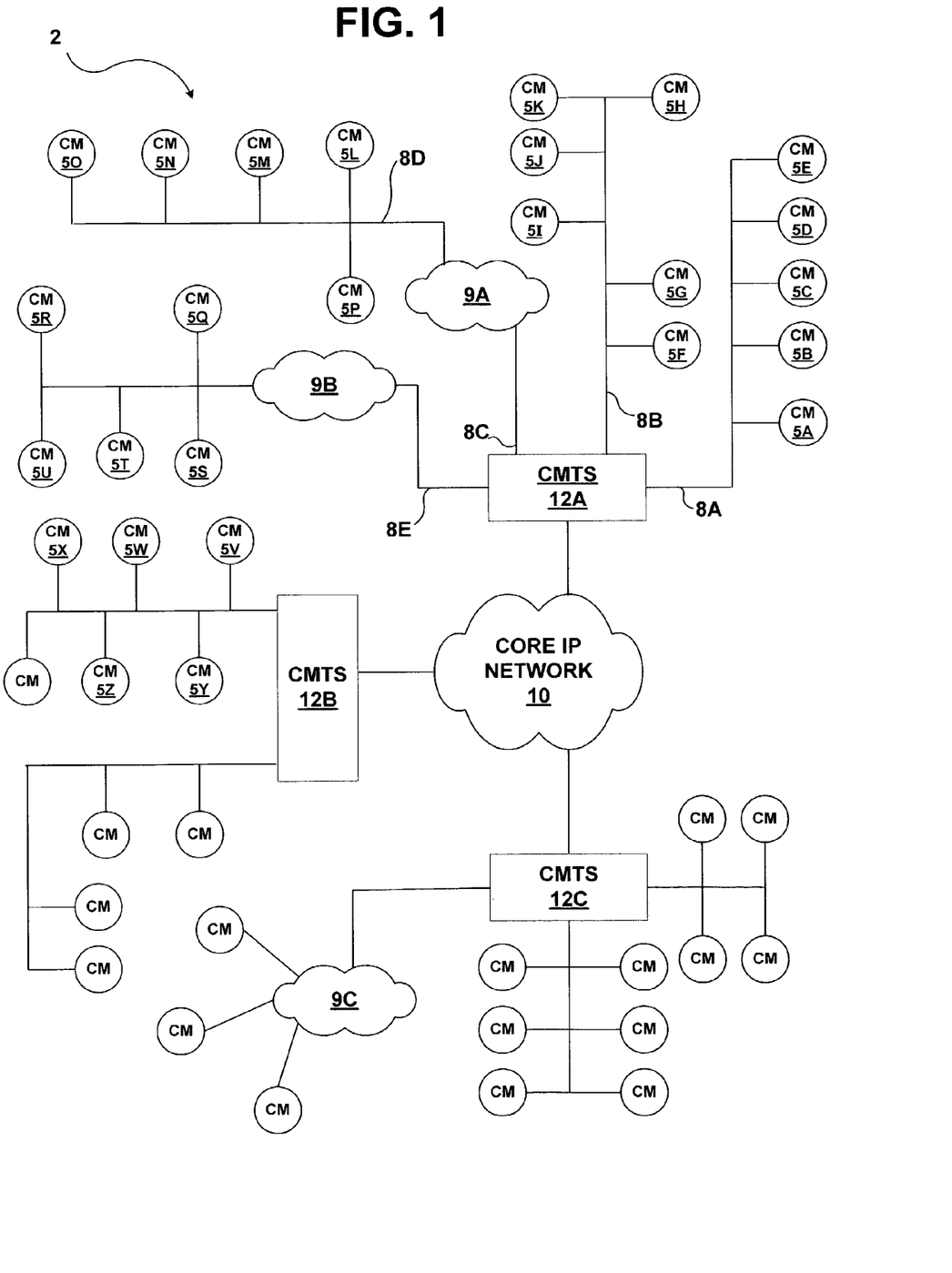
FIG. 1 is a block diagram illustrating a cable network that can be configured to execute principles consistent with the invention.

FIG. 1 is a block diagram illustrating an exemplary cable network 2 that can be configured to promote upstream bandwidth efficiency consistent with the principles of the invention. As shown in FIG. 1, cable network 2 includes one or more CMTSs 12A–12C. Each of CMTSs 12 provides a computer interface between CMs 5 (only CMs 5A–5Z are labeled in FIG. 1), and one or more routers (not shown) within a core IP network 10. Each of CMTSs 12 directs communication between CMs 5 and other computers attached to the core IP network 10. The core IP network 10 may comprise a global network such as the Internet, which include the IP network of the cable operator or a public or private IP packet network such as a corporate Wide Area Network (WAN).

Each of CMTSs 12 may operate in a substantially similar manner. Using CMTS 12A by way of example, CMTS 12A may broadcast information over a downstream channel of the coaxial cable (only coaxial cables 8A–8E are labeled in FIG. 1 for simplicity). Each of CMs 5 served by that downstream channel may extract packets from the broadcast information, such as the data packets (if any) that are addressed to the respective CM by destination address in the packet header. Communications from CMTS 12A to CMs 5 are referred to herein as downstream communications, and are typically assigned a particular frequency band unused by cable TV signals. In cable network 2, downstream communications are not subject to collision problems because each of CMTSs 12 is the only device transmitting on a downstream channel with respect to a given set of CMs 5 attached to that downstream channel.

In some cases, the transmission line between CMTS 12A and a set of CMs 5 may include two or more different media. For example, coaxial cable 8 may be connected to CMTS 12A and each CM. As illustrated in FIG. 1, media 9A–9C (hereafter media 9) may exist between coaxial cable 8 in one or more locations. For example, media 9 may include fiber nodes and optical fiber for converting signals over coaxial cable 8 to optical signals, and then back again. In this manner, optical signals or other types of signals may exist within media 9 but are converted back to radio frequency (RF) signals before reaching an RF port of a CMTS linecard (upstream) or before reaching CMs (downstream). The use of optical fiber or other media may reduce signal attenuation particularly when signals are sent over a significant geographical distance. These or other transmission media 9 may be used to transmit signals back and forth between coaxial cable(s) connected to CMTS 12A and coaxial cables connected to CMs 5.

In accordance with the principles of the invention, techniques can be implemented to improve upstream communication in cable network 2. Herein, the phrase "upstream communication" refers to communication from a respective one of CMs 5 to a respective one of CMTSs 12. Generally, upstream communication is assigned a frequency band that is different from that assigned to downstream communication and different from cable television broadcasts. The frequency band assigned to upstream communication may be partitioned to many upstream channels. An upstream channel is assigned to a set of CMs and a CM may have access to more than one upstream channels. An upstream scheduler is used for each upstream channel to control the CMs that have access to that channel.

Upstream communication raises several challenges. For example, the implementation of upstream data communication encounters limited bandwidth availability, poor channel quality (compared to downstream), and the potential for collision of data transmitted on the upstream channel.

As mentioned above, several versions of DOCSIS standards have been developed to facilitate two-way packet communication in an HFC network like system 2. DOCSIS based protocols or their counterpart in non-cable networks may utilize reservation based time division multiple access (TDMA) techniques in which a given one of CMs 5 reserves time slots in order to send a packet to CMTS 12A on the upstream channel. The reservation-based TDMA protocol can avoid the occurrence of packet collisions on the upstream channel, but must deal with collision problems associated with time-slot requests.

In particular, DOCSIS requires each of CMs to make a time slot reservation for transmission of each upstream data packet. In other words, each of CMs 5 must reserve a needed number of time slots in order to transmit data to one of CMTSs 12 on the upstream channel. After obtaining a reservation, one of CMs 5 can transmit the data packet during the reserved time slots. Such a reservation-based system can avoid data packets from being sent from different CMs at the same time, in which case the data packets sent from the different CMs would collide on the shared upstream channel within the coaxial cable and would fail to reach the CMTS for delivery to the core IP network such as the Internet or Corporate WAN.

The CMTSs 12 regularly transmits MAPs over the downstream channels to inform the connected CMs 5 that share an upstream channel if and when they can transmit packets on that channel during a MAP interval. The MAP may also define a contention region that specifies within the corresponding MAP interval a set of time slots during which any CM can transmit a time slot request, sometimes referred to as bandwidth request, for transmitting its waiting packet. The MAP may also define a grant region that identifies time slot grants during which each CM that received a grant can transmit a packet on the upstream channel in the time slots allocated.

Time slot requests sent over the upstream channel during the defined contention region may collide with other time slot requests if two or more CMs 5 select the same time slot for transmission of their time slot requests. CMs 5 involved in a collision would learn of the collision upon receiving a particular subsequent MAP that does not grant or acknowledge the previous request. Unlike devices in Ethernet systems, CMs are not capable of detecting collisions on the upstream channel. Accordingly, each of CMs 5 determines that its time slot request has collided upon receiving a MAP in which it expects a grant or acknowledgment, but fails to receive a grant for, or see an acknowledgement of receipt of, its time slot request. In that case, the CM would resend the time slot request following a backoff routine set forth by DOCSIS.

As described herein, various techniques can be used to improve upstream communication and thereby increase the bandwidth available for user data, i.e., for data grants in the upstream channel. For example, improved upstream communication may become more and more important as the Internet becomes more and more interactive. As a few examples, Internet gaming, file sharing, and other interactive Internet applications can require significant upstream bandwidth so that relatively large amounts of information can be sent from a respective one of CMs 5 to the corresponding one of CMTSs 12. Accordingly, the techniques described herein may become more useful as interactive Internet applications become more prominent and widespread. Efficient upstream scheduling, however, is also very important even in the absence of new applications because many HFC networks designate a small-size and poorer-quality frequency band for upstream data transmission, the spectrum quality of which is not of sufficient quality for TV broadcast.

The techniques described herein may involve dynamically adjusting various parameters that control and define upstream communication. For example, parameters such as the backoff window used for time slot requests following a collision may be dynamically controlled by the upstream scheduler within the CMTS. Other parameters or variables, such as the size of a contention region of MAP intervals sent from one of CMTSs 12 to one of CMs 5, may be controlled or dynamically defined at a CMTS. By allowing dynamic adjustment of these or other variables that affect upstream communication, the upstream scheduler may be more adaptive to different traffic scenarios. Accordingly, upstream communication can be improved in terms of increased upstream bandwidth available for data as perceived by a given one of CMs 5, particularly during times of high upstream traffic situations.

If the contention region within a MAP interval is too large, then the available upstream bandwidth for packet transmission, i.e., for time slot grants, will be limited, while an excessive portion of the contention region will go unused. On the other hand, if the contention region within a MAP interval is too small, then the collisions within the contention region will be excessive. In this latter case, the number of successful time slot requests will be small and the upstream scheduler will have fewer than desired number of grants to issue. As a result, the MAP interval is smaller and the upstream scheduler generates MAPs more frequently, each of which contains a contention region leading to an excessive supply of contention region at the expense of upstream bandwidth available for user data. Therefore, upstream bandwidth efficiency can benefit from a managed balance between the contention region and the grant region within a MAP interval. Such a balance can be exploited with respect to the fluctuation of the underlying upstream traffic condition.

In one embodiment, consistent with the principles of the invention, key traffic parameters are identified that may determine an effective balance. In order to achieve or at least approximate this balance practically, the size of the contention region within a MAP interval can be adjusted dynamically as a function of the latest traffic conditions defined and measured with a proper metric, as will be described. In general, when a greater number of CMs 5 are requesting time slots for transmission of data packets, the contention region may be dynamically increased to reduce the likelihood of collisions occurring during the contention region. When fewer CMs 5 are sending requests on the contention region, however, the contention region may be reduced to allow for more bandwidth available for user data, e.g., more grants and/or larger grants for upstream packet transmission.

At the same time, DOCSIS requires that each of CMs 5 define a backoff window on a dynamic basis to balance the desire to more quickly transmit time slot requests with the desire to avoid collisions on the upstream channel. As outlined in greater detail below, larger backoff windows may be more likely to avoid collisions, but may result in more delay in the transmission of the time slot request. Before it suffers from a collision, a CM uses the "Initial Backoff Window" as its backoff window. After each collision the CM expands its backoff window, by a factor of 2 in the case of DOCSIS, so long as the result does not exceed the "Final Backoff Window." The Initial Backoff Window and the Final Backoff Window are supplied, and may be updated as frequently as necessary by the upstream scheduler within the CMTS.

In one embodiment, the invention provides a technique by which the upstream scheduler of the CMTS dynamically adjusts the setting of the Initial Backoff Window and the Final Backoff Window to minimize the delay of transmitting a time slot request on one hand, while preventing system instability on the other hand.

Figure 2:
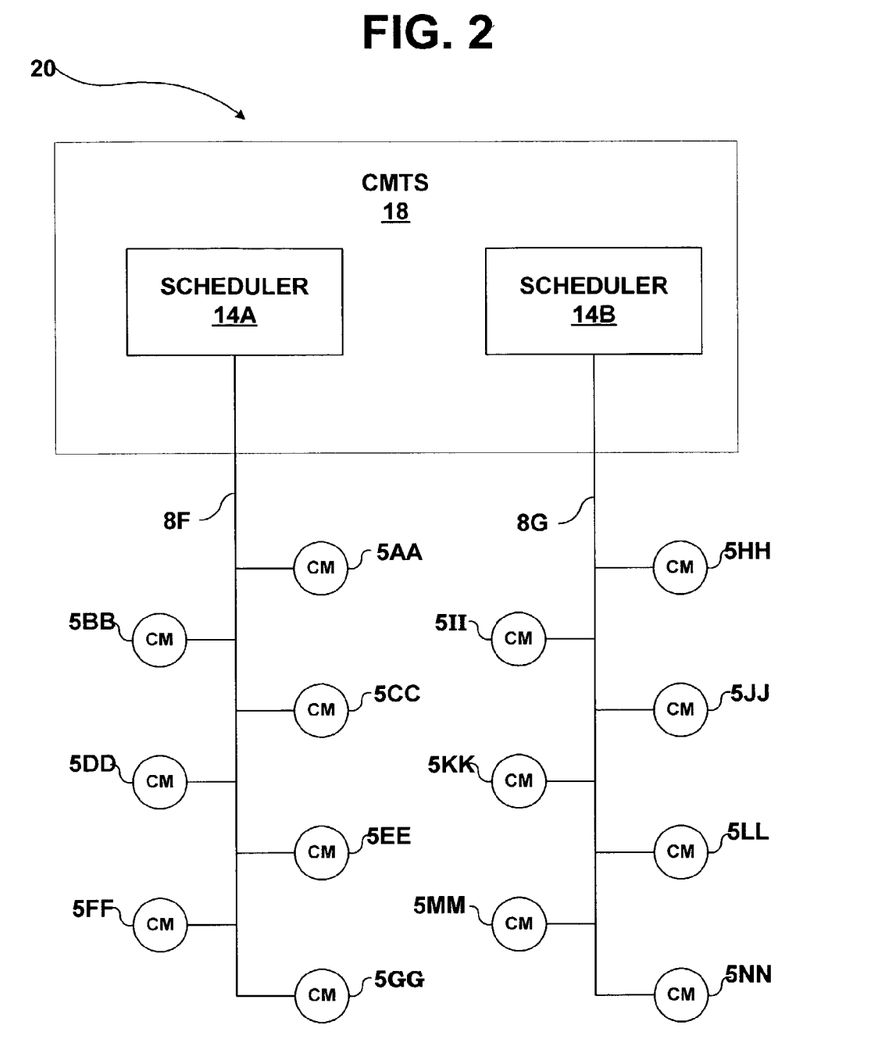
FIG. 2 is a more simplified block diagram of a cable network that can be configured to execute principles consistent with the invention

FIG. 2 is a simplified block diagram of a cable network system 20 in which a CMTS 18 is connected to a number of CMs 5AA–5PP via coaxial cables 8F–8G or a hybrid fiber-coax medium. System 20 may be similar to cable network 2 (FIG. 1) in function and operation, but is simplified for illustrative purposes. CMTS 18 serves as the interface between the CMs 5 and the core IP network such as the Internet. CMTS 18 controls one or more upstream channels and one or more downstream channels, e.g., on a network that facilitates data communication between computers equipped with the CMs 5 and various other computers attached to the core IP network. A CM may have access to more than one upstream channel, though only one is shown in FIG. 2 to simplify the illustration.

More specifically, CMTS 18 may support a data-over cable protocol such as one of the DOCSIS based protocols. As mentioned, DOCSIS protocols require CMs 5 to make a time slot reservation for transmission of each upstream data packet. After obtaining a reservation, i.e., obtaining within a MAP interval a grant of time slots on the upstream channel, the given CM can transmit the data packet during the reserved time slots. In this manner, packet collisions on the same upstream channel 8 can be avoided during a grant region where the time slot grants are allocated to CMs 5 with no conflict.

Each of schedulers 14 corresponds to a particular upstream channel of the DOCSIS network. In some cases, CMTS 18 includes a chassis that includes a number of CMTS line cards (LCs). Each LC may provide a set of upstream ports, and each port may support a number of upstream channels. A different upstream scheduler 14 is used for each upstream channel. Thus, a number of schedulers may exist for each upstream port, a number of ports may exist for each LC, and a number of LCs may exist inside a CMTS chassis.

Figure 3:
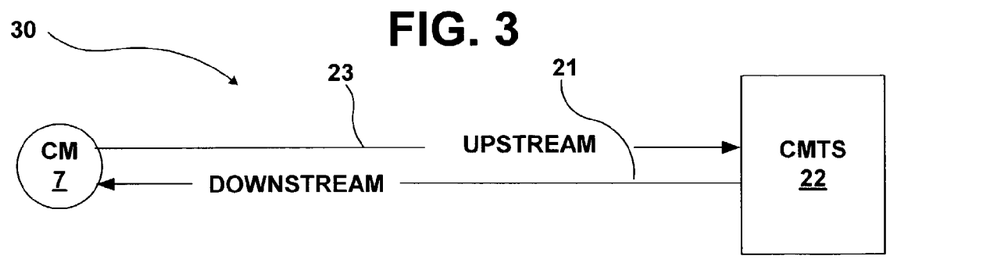
FIG. 3 is a block diagram illustrating upstream and downstream communication between a CM and a CMTS FIG. 4 a more detailed block diagram of one embodiment of a CMTS.

FIG. 3 is a block diagram of cable system 30 in which a CMTS 22 connected to a representative CM 7. As shown, information sent from CMTS 22 to CM 7 is broadcasted on a downstream channel 21, i.e., signals modulated at a given frequency defined for downstream packet transmissions. Information sent from CM 7 to CMTS 22 may be transmitted during granted time slots of upstream channel 23, which may define signals modulated at a frequency different from that associated with downstream channel 21. Again, communication on upstream channel 23 may occur according to a time slot reservation protocol such as a DOCSIS protocol in order to ensure that data packets transmitted by CM 7 do not collide with data packets transmitted by one or more other CMs on the same upstream channel. Channels 21 and 23 may reside on the same coaxial transmission line, but are assigned different frequency bands.

One known technique used by DOCSIS to improve upstream channel efficiency is referred to as "piggybacking" of time slot requests. Piggybacking is used when a given CM 7 has one or more data packets queued when it is transmitting a packet on the upstream channel. For each packet, the given CM 7 must reserve a number of time slots needed to transmit it on the upstream channel. However, a time slot request may be piggybacked with the transmission of the preceding packet. In other words, a given CM 7 may only need to transmit one time slot request using the contention approach. Then, upon receiving the grant of time slots requested, the given CM 7 piggybacks the time slot request for the next packet within the data packet transmitted using the grant. For piggybacking, the next time slot request and preceding data packet ordinarily reside within a common range of time slots granted for the previous time slot request.

In this manner, when a given CM 7 has a number of packets to transmit, it can reserve one time slot via a time slot request sent during an allotted contention region of the upstream channel, and can thereafter piggyback the subsequent requests with each previous packet transmission. Piggybacking can streamline upstream packet transmission and thereby increase upstream bandwidth available for data by saving contention overheads. Also, piggybacking can avoid the occurrence of collisions on the upstream channel during the contention region by shifting time slot requests from the collision-prone contention region to collision-proof grant region once a given CM 7 has been granted its requested time slots for a first packet.

Another technique that may be implemented in DOCSIS based cable systems to improve upstream channel efficiency and stability relates to the concept of backoff windows. The backoff window refers to the number of slots within one or more contention region(s) over which a given CM 7 randomly selects a slot for transmission of its time slot request. The backoff window may comprise all of the slots of the contention region, or a subset of the slots of the contention region, if desired. In addition, the backoff window may comprise a larger number of slots than the slots in the contention region, in which case the requesting CM would select a slot from a set of slots that span two or more contention regions of two or more MAP intervals.

In accordance with the principles of the invention, the lower and upper limits of the backoff window, i.e., Initial Backoff Window and Final Backoff Window used by the CMs may be dynamically defined to seek a balance between the desire to transmit a time slot request quickly and the desire to minimize the likelihood of collisions and instability. In particular, an Initial Backoff Window (which must be power of two in slots in DOCSIS) may be selected to correspond to the size of the dynamically adjusted contention region. Selecting the Initial Backoff Window to be equal to the size of the contention region can achieve a desirable balance between defining a backoff window that is too small (which may cause excessive collisions while leaving some slots in the contention region unused) and defining a backoff window that is too large (which may cause excessive delays in the transmission of time slot requests). For a given CM, according to DOCSIS, the backoff window may thereafter increase for each successive time slot request in the event collisions continue to occur.

Also, a final backoff window may be selected to improve upstream channel efficiency and stability. In particular, the Final Backoff Window can be selected to be equal to or larger than the number of active CMs for a given upstream channel of a CMTS. For example, in FIG. 2, if all seven CMs (5AA–5GG) are active in one upstream channel, the Final Backoff Window may be defined to be eight slots. Moreover, this maximum backoff window parameter may change dynamically, e.g., if more CMs become active on the given upstream channel, or one or more active CMs on the channel becomes inactive. In any case, defining the Final Backoff Window to correspond to a number that is greater than or equal to the number of CMs that may compete for time slots in the contention region, system stability can be ensured. Additional details of the adjustment of the Initial and Final Backoff Windows are provided below.

As shown in FIG. 2, CMTS 18 may include one or more upstream schedulers 14A, 14B. In general CMTS 18 may include a scheduler for every upstream channel through which a number of CMs communicate with CMTS 18. Schedulers 14 may allocate time slots in response to successfully received time slot requests according to any desired strategy within the DOCSIS framework. Schedulers 14 may be implemented as software, hardware, firmware, or various combinations. In one embodiment outlined in greater detail below, the schedulers may be implemented as hardware, software or firmware within LCs that make up a CMTS. Each LC may be equipped with one or more physical upstream RF ports through which a number of CMs 5 can be coupled to CMTS 18. Each port may support one or more upstream channels each of which has an upstream scheduler that coordinates the upstream data transmissions from CMs 5 to the CMTS 18. The upstream schedulers may work independently of one another or may be coupled.

Figure 4:
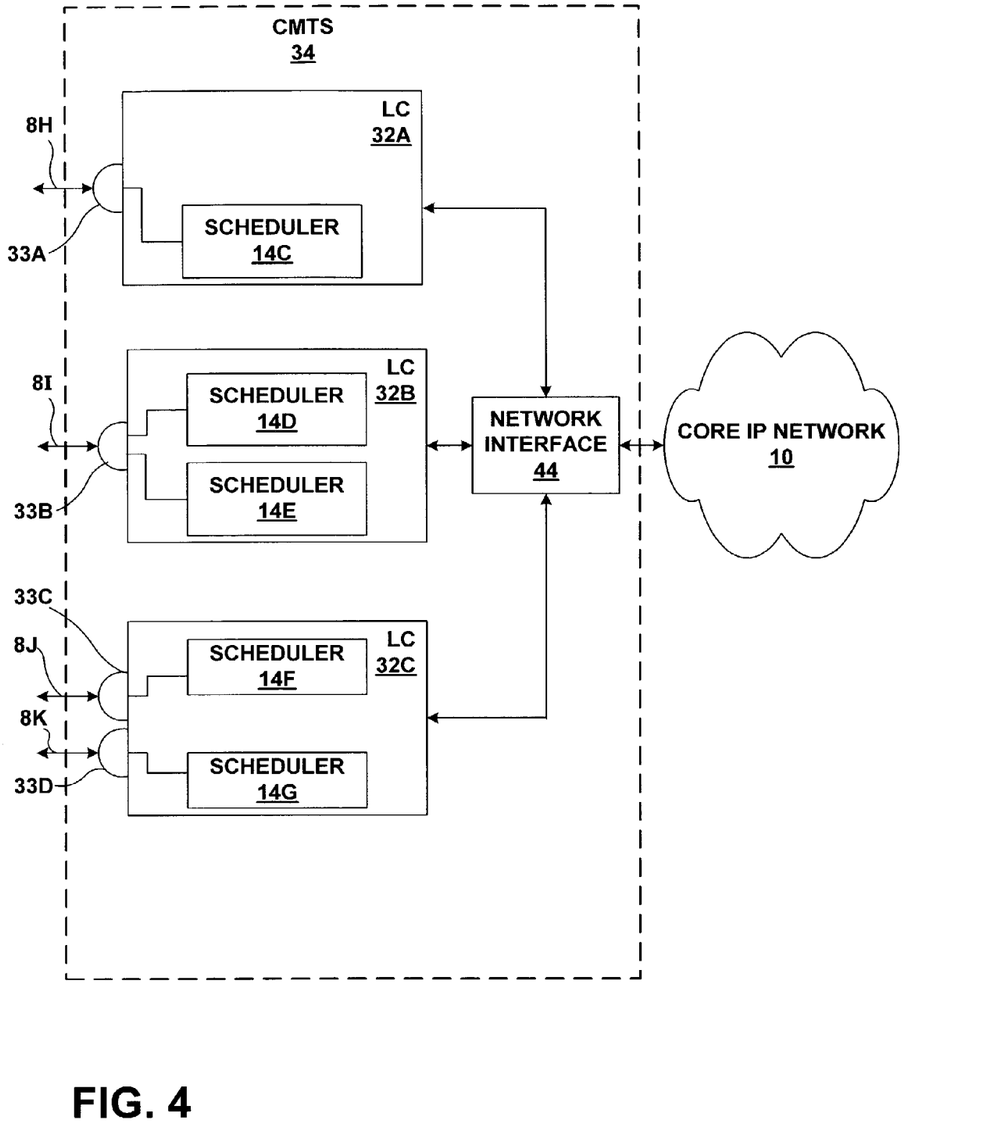

FIG. 4 is a more detailed block diagram of an exemplary embodiment of a CMTS 34. As shown, CMTS 34, together with a network interface 44 with Layer-3 functionalities, provides the interface between a DOCSIS network and a core IP network 10.

CMTS 34 comprises one or more LCs 32A–32C, each of which defines one or more upstream ports 33A–33D. Each of ports 33 may support one or more upstream channels each of which is controlled by one of upstream schedulers 14C–14G that coordinates the time slot allocation scheme for the respective upstream channel. Again, schedulers 14 may be implemented in hardware, software, firmware, or various combinations. If equipped with Layer-3 functionality, an LC may be directly connected to the core IP network 10, otherwise, an LC may feed into a network interface 44 that performs (Layer-3) routing functions and collectively couples the LCs 32 to the core IP network 10. In other words, routing functions may be incorporated into each of LCs 32, or may be performed in a separate physical component. In short, network interface 44 may be implemented within LCs 32 or separately from LCs 32.

In any case, an upstream scheduler 14 dynamically schedules each MAP interval and broadcasts the respective MAP on a downstream channel that serves the same set of CMs as the upstream channel on the respective one of cables 8 in order to inform these CMs (not shown) whether their time slot requests have been granted, and if so when a given CM can transmit a packet on the upstream channel within a MAP interval.

Figure 5:
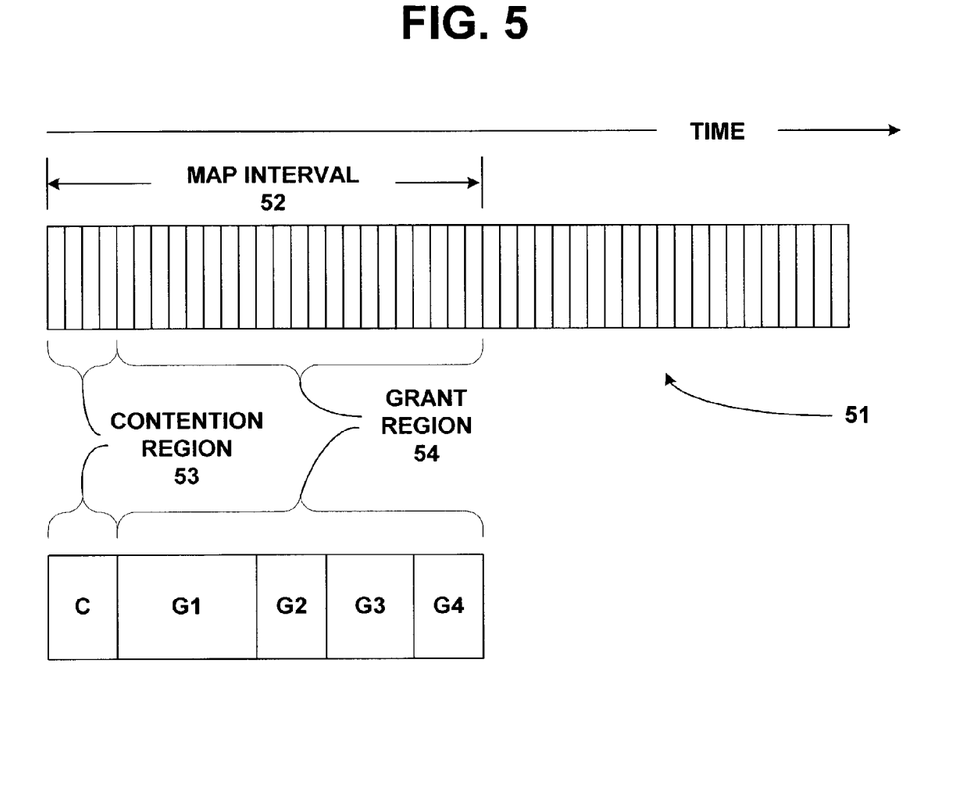
FIG. 5 is a conceptual diagram illustrating the concept of data transmission according to a MAP consistent with the principles of the invention. (This is DOCSIS)

FIG. 5 is a conceptual diagram of a stream 51 of TDMA slots. Each slot within stream 51 is often referred to as a "minislot" in DOCSIS compliant systems. Specifically, in DOCSIS, each slot (minislot) is 6.25* (N) μsec, where N is an integer, although the invention is not limited in that respect. In that case, a 5.12 Mbps channel with N=4 may result in one slot defining 16 bytes. Accordingly, in that case, a minimum-size 64-byte packet would require four contiguous slots for upstream transmission, and an maximum-size Ethernet frame of 1522 bytes would need ninety-six slots.

Using system 20 of FIG. 2 for purposes of explanation of FIG. 5, each of upstream schedulers 14 generates MAPs which are broadcasted to CMs via the downstream channel to which these CMs are attached. The broadcasted MAPs define MAP interval 52 that corresponds to a number of contiguous TDMA slots. The size of the MAP interval 52 may be static or dynamic as defined by the respective broadcasted MAP. CMTS 34 transmits a MAP generated by one of upstream schedulers 14 well before the MAP interval starts in order to ensure that the corresponding CMs have sufficient time to react to the MAP and transmit data packets or time slot requests on the upstream channel accordingly during the MAP interval.

The MAP interval 52 may further define a contention region 53 and a grant region 54. The contention region 53 identifies a set of slots during which any CM attached to a CMTS 34 can transmit a time slot request on the upstream channel. The grant region 54 defines the timing and length of one or more time slot grants (G1–G4) during which particular CM(s) have been granted time slots for packet transmission on the upstream channel. Each grant (G1–G4) in the grant region 54 may correspond to a unique CM which can be identified in the broadcasted MAP. Whenever necessary, the MAP may define other time slots within the MAP interval 52, such as slots designated for signaling or control purposes. The contention region may consist of more than one set of contiguous slots within a MAP interval, even though 53 shows only one.

In accordance with the principles of the invention, each of upstream schedulers 14 defines the size of the contention region 53 relative to the size of the MAP interval 52 on a dynamic basis. If an upper limit for the size of a MAP interval is imposed, as is usually the case, then upstream schedulers 14 may define the size of the grant region relative 54 to the size of the MAP interval 52 on a dynamic basis. More specifically, schedulers 14 define the size and layout of the MAP interval based on current traffic conditions and performance considerations. In one example, schedulers 14 may use a feedback control technique in which each of schedulers 14 estimates or identifies the number of CMs competing for contention slots, and adjusts the number of contention slots in a subsequent MAP interval based on the estimated number of CMs competing for the slots.

The estimation is conducted by CMTS 34 on the receiving end of the upstream channel and is typically based on one or more of the following three observations: collision ratio, empty ratio, and success ratio. The collision ratio is the proportion of time slots within one or more contention regions that contain collided time slot requests. The empty ratio is the proportion of time slots within one or more contention regions that contain no time slot requests. The success ratio is the proportion of time slots within one or more contention regions that contain exactly one (successful) time slot request. In this manner, traffic fluctuations may be accounted for in the MAP generation process to improve upstream slot allocation.

There are at least two problems, however, with the feedback control technique mentioned above. First, according to DOCSIS, each CM uses a dynamic backoff window to reduce repeated collisions. Accordingly, a feedback control based on the estimated number of CMs competing for contention slots may be inadequate insofar as the estimation does not account for the backoff factor. Second, because DOCSIS implements the concept of piggybacking of time slot requests once a CM has received a time slot grant, the above feedback algorithm may significantly misrepresent the actual number of CMs that will compete for the time slots within the next contention region. In short, the use of the backoff window mechanism and the piggybacking techniques used by DOCSIS loosens the relationship between the estimated number of CMs competing for the contention slots and the actual future number of CMs competing for the contention slots.

For these reasons, in accordance with the principles of the invention, each of upstream schedulers 14 defines the size of the contention region 53 relative to the size of the MAP interval 52 based on alternative traffic parameters that can account for piggybacking and/or backoff windows. More specifically, traffic parameters that measure the average packet size (average grant size) and/or the piggyback ratio may be used by upstream schedulers 14 to schedule each MAP interval on a dynamic basis. The use of such parameters can be justified and defined by a comprehensive mathematical analysis in which an equilibrium equation is established by which the upstream scheduler dynamically adapts to the latest upstream traffic characteristics and constantly exploits maximal upstream data throughput.

The average packet size can be determined by identifying the average size of grants within the grant regions of the MAP intervals. The average size of the grants has a close relationship with the size of the contention region needed because, while a large packet will require a larger number of time slots in the grant region, it uses one time slot in the contention region to transmit its time slot request. Therefore, if the average packet size is large, the number of grants that can fit in a given MAP interval is small, which implies that the number of successful time slot requests that the upstream scheduler can handle (without overloading) is small. This, in turn suggests that the number of time slots needed is small. The average packet size may be calculated based on the grant sizes observed in the MAP intervals within a sliding window, or alternatively a recursive estimation technique which calculates the average packet size by weighing the measurements taken from more recent MAP intervals s more heavily than those taken from older MAP intervals. In any case, in accordance with the principles of the invention, scheduler 14 may select the contention region for a MAP interval based at least in part on the average packet size estimated.

The piggyback ratio refers to a ratio of the number of piggybacked time slot requests received during grant regions 53 relative to a total number of time slot requests received during both the grant regions 53 and the contention regions 52. In other words, the piggyback ratio identifies the ratio of piggybacked requests to the total number of received requests. The piggyback ratio reflects an important aspect of user traffic pattern and may provide a more accurate estimate of the contention demand because it accounts for time slot requests submitted during the contention region and piggybacked time slot requests. Like the average packet size, the piggyback ratio may also be calculated using a sliding window covering a number of most recent MAP intervals or a recursive estimation technique that weighs the measurements taken from the more recent MAP intervals more heavily. In any case, in accordance with the principles of the invention, scheduler 14 may select the contention region for a MAP interval based at least in part on the piggyback ratio.

By way of example, a desired balance for the size of the contention region 52 may be achieved by considering or defining one or more of the following variables.

c=Number of contention slots in a MAP Interval, i.e., size of the contention region in number of slots defined by a MAP $\tau$=maximum MAP interval, in number of slots (This will be approximately the prevailing size of MAP intervals in a stable system when the upstream traffic is heavy)

N=number of cable modems competing for contention slots $W_I$=Initial Backoff Window (in number of slots within contention regions only)

$W_F$=Final (maximum) Backoff Window (in number of slots within contention regions only)

W=real time equivalent (in number of slots on the upstream channel, random) of $W_F$ $W_k$=backoff window for the $k^{th}$ service flow (in contention slots) during a contention slot, where $W_I \leq W_k \leq W_F$ for all $1 \leq k \leq N$ L=mean packet length (in slots)

$\beta$=Piggyback ratio=(Piggyback requests)÷(All requests)

For example, let $\rho$=Probability of a successful contention minislot request.

Thus, $$\rho = (1/W_1)(1-1/W_2)(1-1/W_3) \ldots (1-1/W_N) +$$
$$(1/W_2)(1-1/W_1)(1-1/W_3) \ldots (1-1/W_N) +$$
$$(1/W_N)(1-1/W_1)(1-1/W_2) \ldots (1-1/W_{N-1})$$
$$= N(1/W)[1-1/W]^{N-1} \text{ for some } W, \text{ with } W_I \leq W \leq W_F$$

and $\rho \leq [N-1/N]^{N-1}$ (equality if W=N), and $\rho \approx e^{-1}$ for $N \geq 5$, (the optimization is unimportant if N is small) and therefore $\rho \approx 0.368$ for $N \geq 5$.

Now let S=the normalized throughput=proportion of slots that are used by data grants on the upstream channel. Consider the time interval W (defined above) in which there are $W_F$ contention slots:

$$S=(W-W_F)/W=1-W_F/W$$

In that case, the equilibrium equation is:

$$[\rho W_F/(1-\beta)]L=W-W_F$$

and thus $$W_F/W=1/[1+\rho L/(1-\beta)] \geq 1/[1+0.368L/(1-\beta)].$$

By design, if $W_F/W \geq C/\tau$, then the maximum throughput becomes:

$$S_{MAX}=\min\{1-c/\tau, 1-1/[1+0.368L/(1-\beta)]\}$$

Therefore, for maximum upstream throughput as a function of c, c should be selected such that:

$$c/\tau[1+0.368L/(1-\beta)]$$

Also, the maximum MAP interval value ($\tau$) may be selected to be as large as possible to minimize the percentage of processing overhead and downstream channel load.

In short, each of upstream schedulers 14 may track the mean packet size L and the piggyback ratio $\beta$ over a period of time, and may update the calculated values according to a sliding window, or may use recursive estimation techniques that exponentially decay the weight given to older measurements. For maximum upstream throughput, scheduler 14 may select:

$$c \approx FLOOR\{\tau/[1+0.368L/(1-\beta)].$$

Simulations have shown that such techniques by upstream schedulers 14 can significantly improve maximum upstream data throughput over the approach that uses a constant c.

By way of example, each of upstream schedulers 14 may implement a lookup table (LUT) in order to dynamically size the contention region very quickly. For example, each of upstream schedulers 14 may be programmed to select the value for c using Table 1, provided below, which corresponds to a 5.12 Mbs channel with 16-byte slots.

TABLE 1

$c = FLOOR \{\tau/[1 + 0.368L/(1 - \beta)]\}$

| L | τ | c<br>β = 0.9 | c<br>β = 0.75 | c<br>β = 0.5 | c<br>β = 0.25 | c<br>β = 0 |
|---|---|---|---|---|---|---|
| 40 (640 bytes) | 400 (10 ms) | 2 | 6 | 13 | 19 | 25 |
| 30 (480 bytes) | 400 (10 ms) | 3 | 8 | 17 | 25 | 33 |
| 20 (320 bytes) | 400 (10 ms) | 5 | 13 | 25 | 36 | 47 |
| 10 (160 bytes) | 400 (10 ms) | 10 | 25 | 47 | 67 | 85 |
| 40 (640 bytes) | 200 (5 ms) | 1 | 3 | 6 | 9 | 12 |
| 30 (480 bytes) | 200 (5 ms) | 1 | 4 | 8 | 12 | 16 |
| 20 (320 bytes) | 200 (5 ms) | 2 | 6 | 12 | 18 | 23 |
| 10 (160 bytes) | 200 (5 ms) | 5 | 12 | 23 | 33 | 42 |

To ensure stable operation, the Final Backoff Window used by all the CMs at a given time should always be larger than the number of active CMs competing for contention slots. In a reservation-based TDMA system, when the number of nodes (CMs) is large, instability may occur, possibly causing unbounded packet queuing in the CMs, or even packet dropping. This would occur if the collision ratio is persistently too high.

Importantly, this phenomenon, which is undesirable, can be prevented if $W_F \geq N$. In one example, if:

N=the number of data connections (i.e., active CMs), then let $W_F=2^Y$, where Y=Ceiling $\{\log_2 N(1-\beta)\}$ (DOCSIS requires that $W_F$ be power of 2)

In practice, an even a larger value for Y may be used to ensure stability in the event that β is overestimated. In one extreme, $W_F$=N can be employed.

Figure 6:
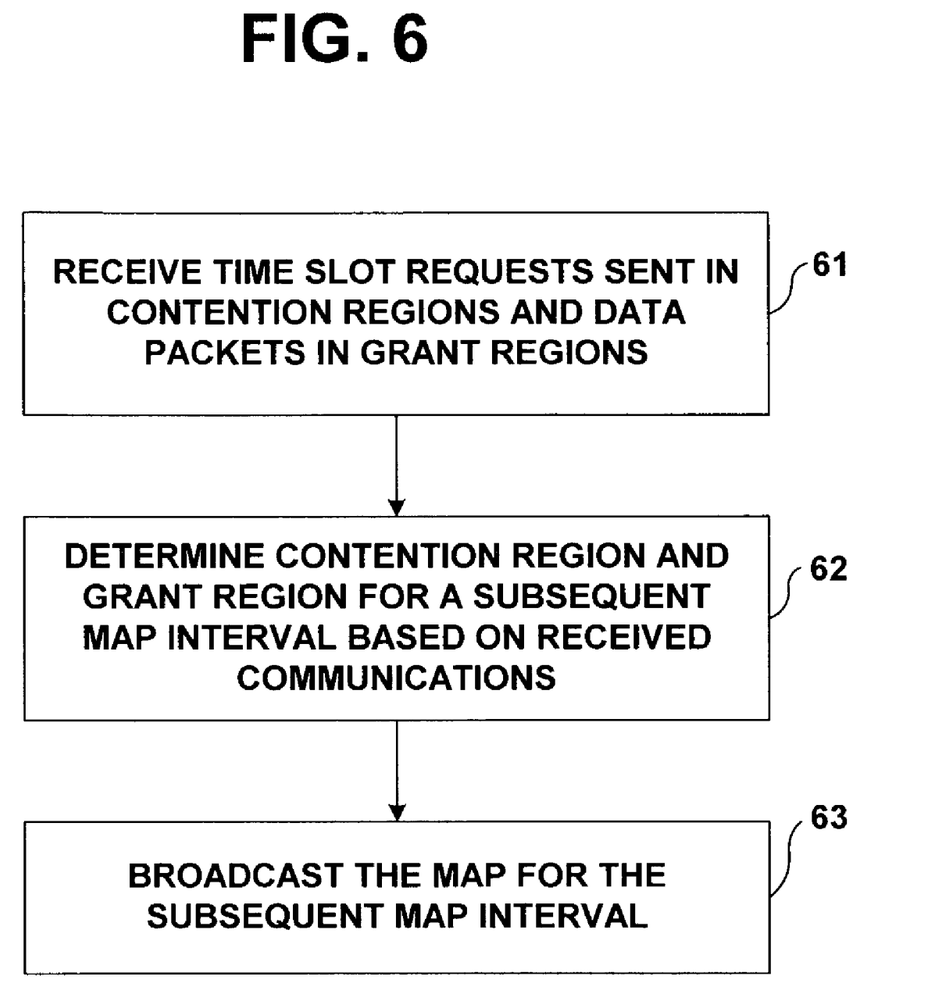
FIGS. 6–8 are flow diagrams illustrating various techniques consistent with the principles of the invention.

FIG. 6 is a flow diagram illustrating a technique consistent with the principles of the invention. Using system 20 of FIG. 2 for purposes of explanation, CMTS 18 receives time slot requests sent by CMs within the contention region (61) of a MAP interval. For example, CMTS 18 may broadcast a MAP which defines a contention region and a grant region within the MAP interval. The grant region may grant time slots to different CMs, allowing the respective CMs to transmit packets during the respective time slots. The contention region, on the other hand, may define a set of slots during which any CM can send a time slot request.

Schedulers 14 dynamically determine a contention region and a grant region for a subsequent MAP interval based on received communications (62). By dynamically adapting to the key traffic parameters, when selecting the size of the contention region within a MAP interval, improved upstream throughput can be achieved. Moreover, in addition to selecting the size of the contention region for an upcoming MAP interval, scheduler 14 also defines the various grants (in response to successful time slot requests) which all together make up the grant region for the MAP interval. The CMTS can then broadcast the subsequent corresponding MAP to the CMs (63) to thereby instruct the CMs regarding the allocation of time slots within the MAP interval. Importantly, the subsequent MAP may define a contention region that is of a different size than the previous contention region.

Figure 7:
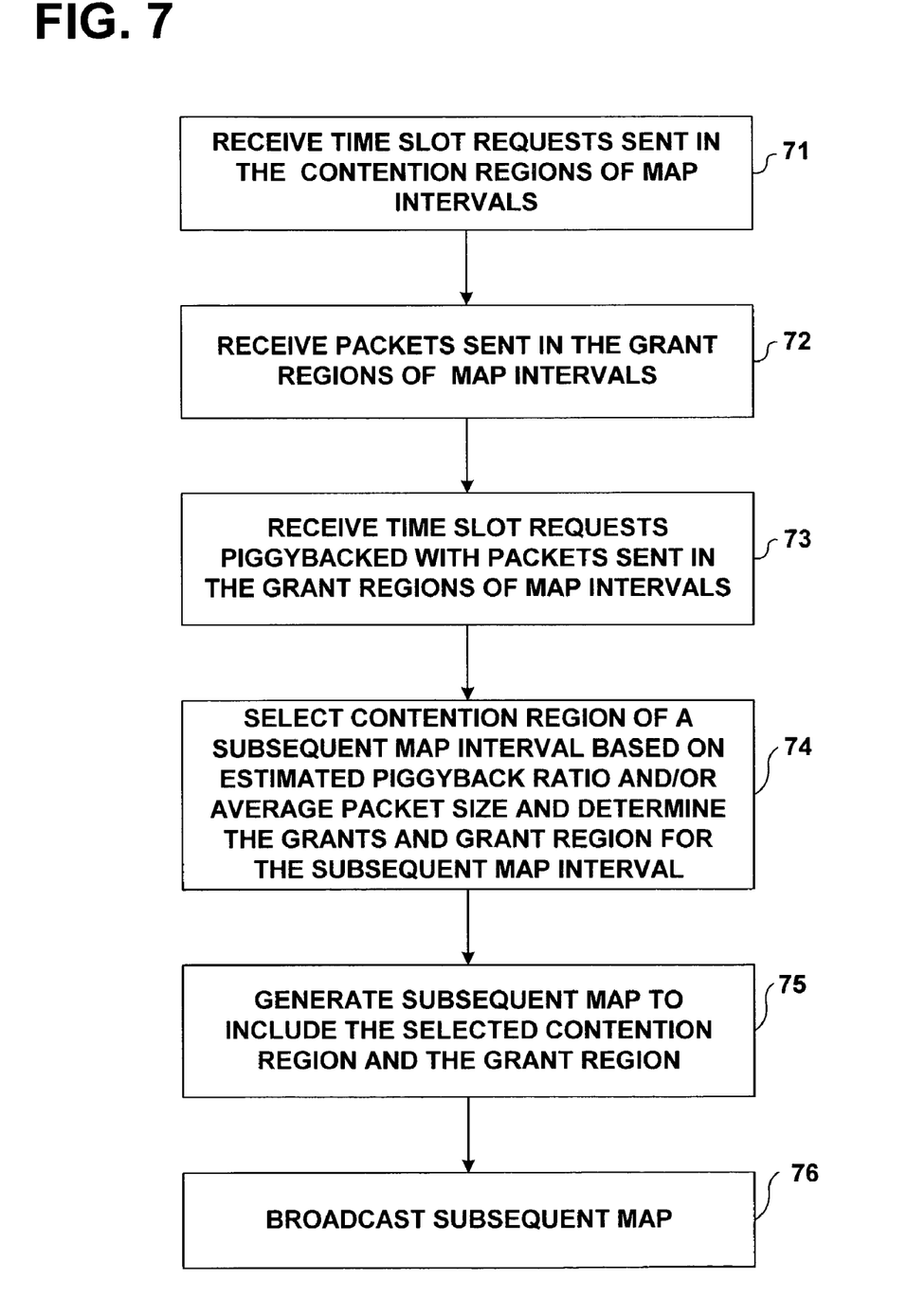

FIG. 7 is another flow diagram illustrating a technique consistent with the principles of the invention. Again, using system 20 of FIG. 2 for purposes of explanation, a CMTS 18 receives time slot requests sent during the contention regions (71) and data packets sent in the grant regions (72) of previous MAP intervals. CMTS 18 may also receive time slot requests piggybacked with the packets sent in the grant regions (73). Generally, piggybacked requests may be inserted in the data packets transmitted in the grant regions. Again, the contention region and grant region within a MAP interval and the MAP interval itself are defined by a MAP broadcasted by CMTS 18 on the downstream channel prior to the start of that MAP interval.

As shown in FIG. 7, CMTS 18 selects the size for a contention region for a subsequent MAP interval based on the latest estimate of the piggyback ratio and/or the average packet size (74). Then, subject to an upper limit on the size of MAP interval, CMTS 18 determines the grants and accordingly the grant region for the same MAP interval. In one specific example, each of schedulers 14 of a CMTS 18 selects the contention region based on both the piggyback ratio and the average packet size, such as by applying the traffic flow equations outlined above. Alternatively, schedulers 14 may implement a lookup table, in order to quickly generate the appropriate value for c (the contention region size in number of slots) based on the estimated values of β (the piggyback ratio) and L (the average packet size). Table 1 provides one simplified example that may be implemented in a lookup table within each of schedulers 14.

Having selected the appropriate size for the contention region based on traffic parameters such as the piggyback ratio and average packet size (74), an upstream scheduler generates a subsequent MAP with the selected size of the contention region (75) and a grant region such that the MAP interval does not exceed its upper limit τ. The grant region of the subsequent MAP interval may define various grants during which selected CMs can use the upstream channel for packet transmission. CMTS 18 broadcasts the subsequent MAP (76) over the downstream channel to all the CMs that share the upstream channel associated with the MAP in order to coordinate the upstream transmissions from these CMs. The MAP can be broadcasted (76) at a time that allows for sufficient time for the attached CMs to react and to time their upstream transmissions accordingly during the MAP interval. A CM that did not previously transmit a time slot request but has a new packet to transmit examines the MAP for contention region only. A CM that has previously transmitted a time slot request examines the grant region of the MAP for a possible grant or looks for a grant pending indication in the MAP.

Figure 8:
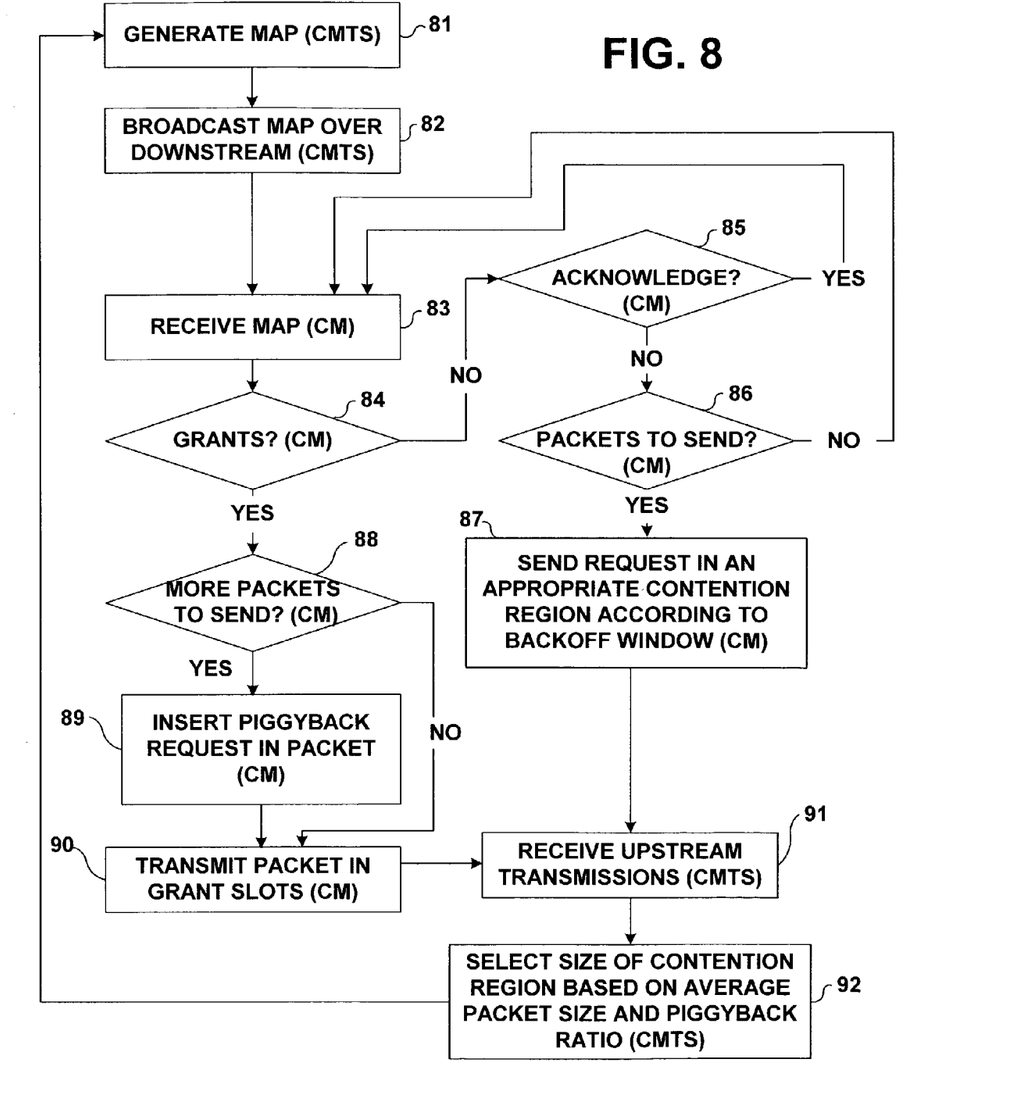

FIG. 8 is another flow diagram illustrating a technique consistent with the principles of the invention. In FIG. 8, the boxes labeled (CM) correspond to actions taken by a CM, and the boxes labeled (CMTS) correspond to actions taken by a CMTS. Again, using system 20 of FIG. 2, for purposes of explanation in accordance with the principles of the invention, CMTS 18 generates a MAP (81) associated with an upstream channel and broadcasts the MAP over a downstream channel of the cable network (82). All the CMs 5 on that upstream channel are capable of receiving on this downstream channel. Accordingly, each CM associated with that upstream channel receives the MAP (83), and examines the MAP to time its upstream transmission of a time slot request or of a data packet. In particular, CMs 5 that have previously transmitted a time slot request examine the grant region defined in the MAP to determine whether its request has been granted (84). If one of CMs 5 determines that no time slot grant was identified in the MAP (no branch of 84), then it determines whether its request was even acknowledged (85), e.g., by an indication of "grant pending." If it does not see such an acknowledgement indication (no branch of 85), then it begins scheduling the retransmission (doubling the backoff window, examining the contention regions of new MAPs, etc.) of the presumably lost time slot request (87).

Also, if one of CMs 5 is not waiting for a grant or acknowledgement, but determines that it does have one or more packets to send on the upstream channel (86), then the respective CM sends a time slot request in the contention region according to its backoff window (87) which is set to the latest Initial Backoff Window broadcasted by the CMTS. Again, the contention region corresponds to a set of slots within a MAP interval intended for any CM to send a time slot request. Accordingly, collisions may occur during the contention region.

The backoff window refers to the number of slots within contention region(s) over which a given CM randomly selects a slot for transmission of a time slot request. Based on the Initial and Final Backoff Window setting strategies described herein, the backoff window may comprise a larger number of slots than the slots in one contention region, in which case the requesting CM would select a slot from a set of slots that span two or more contention regions of two or more consecutive MAP intervals. The CMTS dynamically adjusts and broadcasts the values of the Initial (minimum) Backoff Window and the Final (maximum) Backoff Window. For a CM, the initial time slot request for a new packet is transmitted according to the Initial Backoff Window, and the backoff window is then increased for subsequent requests relating to the same packet if collision(s) occur. Specifically, in terms of DOCSIS, the size of the backoff window doubles with each repeated time slot request, subject to the maximum value defined by the Final Backoff Window.

As described above, the Initial Backoff Window may be selected to correspond to the size of the contention region. In particular, selecting the Initial Backoff Window to correspond to the size of the contention region can achieve a desirable balance between defining a backoff window that is too small (which may cause excessive collisions and leave a portion of the contention region totally unused) and defining a backoff window that is too large (which may cause unnecessary delays in the transmission of time slot requests). The Final Backoff Window may be selected to correspond to a number that is equal to or larger than the (estimated) number of active CMs for a given upstream channel of a CMTS. Defining the Final Backoff Window to correspond to a number that is greater than or equal to the number of CMs that may compete for slots during the contention region, can ensure system stability on one hand while adapting to the contention demand on the other. The value for the Final Backoff Window may change as more CMs on an upstream channel becomes active or as active CMs become inactive.

The number of active CMs may be estimated based on, among others, two or three of the following measurements taken during a selected number of MAP intervals: collision ratio, empty ratio, and success ratio. The collision ratio is the proportion of time slots within one or more contention regions that contain collided time slot requests. The empty ratio is the proportion of time slots within one or more contention regions that contain no time slot requests. The success ratio is the proportion of time slots within one or more contention regions that contain exactly one (successful) time slot request.

Once a given CM 5 receives a grant (yes branch of 84), it can transmit a packet in the granted slots (90). Moreover, if the same CM has more packets to send (yes branch of 88), e.g., if the CM has a number of packets queued for upstream transmission, it can piggyback a subsequent time slot request within the packet to be transmitted during the granted slots (89). Again, piggybacking can streamline upstream packet transmission and reduce the contention overhead and thereby increase upstream bandwidth available for user data. Basically, piggybacking can avoid the occurrence of collisions on the upstream channel during the contention region by shifting time slot requests from contention regions (collisions likely) to grant regions (collision-free) once a given CM has been granted the requested time slots for a first packet (yes branch of 84).

After generating (81) and broadcasting a MAP (82), the CMTS subsequently receives the corresponding MAP interval loaded with data packets and time slot requests according to the broadcasted MAP (91). In accordance with the principles of the invention, the CMTS can then select a subsequent contention region based on the updated estimates of the average packet size and the piggyback ratio (92). As outlined above, dynamically adjusting the contention region based on these variables and optionally others can improve upstream throughput under different and/or varying traffic scenarios. In any case, the CMTS generates a subsequent MAP with the selected size of contention region, and the process of FIG. 8 repeats.

A number of embodiments have been described. For example, various techniques have been described for improving upstream channel efficiency in a reservation based TDMA system, such as a DOCSIS network. Nevertheless various modifications can be made without departing from the scope of the invention. For example, the same or similar techniques may be implemented in wireless and fiber optic packet-based networks or any other system that uses reservation-based TDMA techniques. Accordingly the terms map, map interval, TDMA map, contention region, grant region, and the like, apply in DOCSIS and non-DOCSIS TDMA systems alike.

Techniques described herein may be implemented in CMTSs that provide packetized data communication service to the CMs. In either case, certain aspects of the techniques may be implemented in hardware, software, firmware, or any combination thereof. If implemented in software, the techniques may be directed to a computer readable medium comprising program code, that when executed, perform one or more of the techniques described herein. For example, the computer readable medium may store computer readable instructions that when executed in a processor such as a digital signal processor (DSP) cause the respective CMTS to carry out one or more of the techniques described herein. These and other embodiments are within the scope of the following claims.

The invention claimed is:

1. A method comprising:
   selecting a size of a contention region for controlling upstream communication;
   generating information defining the selected contention region;
   transmitting the information to a set of devices;
   receiving upstream communications from the set of devices, and receiving the upstream communications includes:

receiving time slot requests during contention regions of map intervals, receiving packets during grant regions of map intervals, and receiving piggybacked time slots requests, and selecting a different size of another contention region in response to the received communications.

2. The method of claim 1, further comprising selecting the size of the contention regions based at least in part on a piggyback ratio, the piggyback ratio being a ratio of a number of piggybacked time slot requests relative to a total number of time slot requests.

3. The method of claim 1, further comprising selecting the size of the contention regions based at least in part on an average packet size.

4. The method of claim 1, further comprising selecting the size of the contention regions based at least in part on a piggyback ratio and an average packet size of packets, the piggyback ratio being a ratio of a number of piggybacked time slot requests relative to a total number of time slot requests.

5. The method of claim 4, further comprising selecting the size of the contention regions approximately according to the following equation:

$$\frac{c}{\tau} \approx \frac{1}{1 + (0.368)(L)\left(\frac{1}{1-\beta}\right)},$$

wherein c is a number of contention slots in the contention regions, $\tau$ is a number of slots in the map intervals, L is the average packet size, and $\beta$ is a piggyback ratio, the piggyback ratio being a ratio of a number of piggybacked time slot requests relative to a total number of time slot requests.

6. The method of claim 1, wherein the devices comprise cable modems.

7. A method comprising:

selecting a size for a contention region of a time division multiple access (TDMA) map interval based on a piggyback ratio, the piggyback ratio being a ratio of a number of piggybacked time slot requests received during one or more previous grant regions relative to a total number of time slot requests received during one or more previous contention regions and previous grant regions; and transmitting a TDMA map to a set of cable modems, the TDMA map defining TDMA map interval that includes the selected contention region and a grant region.

8. The method of claim 7, further comprising selecting the size of the contention region based at least in part on an average packet size of packets estimated from measurements taken on the grant regions.

9. The method of claim 8, further comprising weighting the average packet size and the piggyback ratio during estimation such that communications received more recently are given larger weights.

10. A method comprising:

receiving information defining a selected contention region of a map interval for upstream communication and the selected contention region define a size selected based at least in part on a piggyback ratio, the piggyback ratio being a ratio of a number of piggybacked time slot requests relative to a total number of time slot requests;

transmitting data according to the map interval; and receiving different information defining a different selected contention region of a different map interval for upstream communication.

11. A device that controls upstream scheduling in a reservation-based time division multiple access (TDMA) system, the device being configured to:

select a size of a contention region for transmitting upstream time slot reservations;

generate information defining the selected contention region;

transmit the information to a set of devices;

receive upstream communications from the set of downstream devices which includes receiving time slot requests during contention regions of map intervals, receiving packets during grant regions of map intervals, and receiving piggybacked time slot requests; and select a different size of another contention region in response to the received communications.

12. The device of claim 11, the reservation-based TDMA system comprising a cable network, wherein the device comprises a cable modem termination system (CMTS) and the set of downstream devices comprise a set of cable modems.

13. The device of claim 11, the device being further configured to select the size of the contention regions based at least in part on a piggyback ratio, the piggyback ratio being a ratio of a number of piggybacked time slot requests relative to a total number of time slot requests.

14. The device of claim 11, the device being further configured to select the size of the contention regions based at least in part on an average packet size.

15. The device of claim 11, the device being further configured to select the size of the contention regions based at least in part on a piggyback ratio and an average packet size, the piggyback ratio being a ratio of a number of piggybacked time slot requests relative to a total number of time slot requests.

16. The device of claim 15, the device being further configured to select the size of the contention regions approximately according to the following equation:

$$\frac{c}{\tau} \approx \frac{1}{1 + (0.368)(L)\left(\frac{1}{1-\beta}\right)},$$

wherein c is a number of contention slots in the contention regions, $\tau$ is a number of slots in the map intervals, L is the average packet size and $\beta$ is a piggyback ratio, the piggyback ratio being a ratio of a number of piggybacked time slot requests relative to a total number of time slot requests.

17. An upstream scheduler for a reservation-based time division multiple access (TDMA) system, the upstream scheduler being configured to:

select a size of a contention region for transmitting upstream time slot reservations;

generate information defining the selected contention region;

transmit the information to a set of devices;

receive upstream communications from the set of downstream devices; and select a different size of another contention region in response to the received communications the upstream scheduler being further configured to select the size of the contention regions based at least in part on a piggyback ratio and an average packet size, the piggyback ratio being a ratio of a number of piggybacked time slot requests relative to a total number of time slot requests.

18. The upstream scheduler of claim 17, wherein the upstream scheduler comprises computer readable instructions stored on a computer readable medium and executed by a processor.

19. The upstream scheduler of claim 17, the upstream scheduler being further configured to:
receive time slot requests during contention regions of map intervals;
receive packets during grant regions of map intervals; and
receive piggybacked time slot requests.

20. The upstream scheduler of claim 17, the upstream scheduler being further configured to select the size of the contention regions based at least in part on a piggyback ratio, the piggyback ratio being a ratio of a number of piggybacked time slot requests relative to a total number of time slot requests.

21. The upstream scheduler of claim 17, the upstream scheduler being further configured to select the size of the contention regions based at least in part on an average packet size.

22. The upstream scheduler of claim 17, the upstream scheduler being further configured to select the size of the contention regions approximately according to the following equation:

$$\frac{c}{\tau} \approx \frac{1}{1 + (0.368)(L)\left(\frac{1}{1-\beta}\right)},$$

wherein c is a number of contention slots in the contention regions, $\tau$ is a number of slots in the map intervals, L is the average packet size and $\beta$ is a piggyback ratio, the piggyback ratio being a ratio of a number of piggybacked time slot requests relative to a total number of time slot requests.

23. The upstream scheduler of claim 17, the upstream scheduler being further configured to weigh the average packet size and the piggyback ratio such that measurements taken more recently are given larger weights.

24. A computer readable medium comprising program code that when executed in a device that controls upstream scheduling in a reservation based time division multiple access (TDMA) system:
selects a size of a contention region for transmitting upstream time slot reservations;
generates information defining the selected contention region;
transmits the information to a set of devices;
receives upstream communications from the set of downstream devices; and
selects a different size of another contention region in response to the received communications and the program code when executed selects the size of the contention regions based at least in part on a piggyback ratio, the piggyback ratio being a ratio of a number of piggybacked time slot requests relative to a total number of time slot requests.

25. The computer readable medium of claim 24, further comprising program code that when executed in the device that controls upstream scheduling selects the size of the contention regions based at least in part on an average packet size.

26. The computer readable medium of claim 24, further comprising program code that when executed in the device that controls upstream scheduling selects the size of the contention regions based at least in part on a piggyback ratio and an average packet size, the piggyback ratio being a ratio of a number of piggybacked time slot requests relative to a total number of time slot requests.

27. The computer readable medium of claim 24, further comprising program code that when executed in the device that controls upstream scheduling selects the size of the contention regions approximately according to the following equation:

$$\frac{c}{\tau} \approx \frac{1}{1 + (0.368)(L)\left(\frac{1}{1-\beta}\right)},$$

wherein c is a number of contention slots in the contention regions, $\tau$ is a number of slots in the map intervals, L is the average packet size, and $\beta$ is a piggyback ratio, the piggyback ratio being a ratio of a number of piggybacked time slot requests relative to a total number of time slot requests.

28. The computer readable medium of claim 24, further comprising program code that when executed in the device that controls upstream scheduling weighs the average packet size and the piggyback ratio such that measurements taken more recently are given larger weights.

29. A reservation based time division multiple access (TDMA) system comprising:
a first device that controls upstream scheduling in the reservation based TDMA system; and
a set of second devices that communicate upstream in the reservation based TDMA system, the first device and set of second devices being configured such that:
the first device selects a size of a contention region for upstream communication, generates information defining the selected contention region, and transmits the information to a set of second devices;
the set of second devices transmit upstream communications to the first device and the first device receives the upstream communications from the set of second devices by receiving time slot requests during contention regions of map intervals, receiving packets during the grant regions of map intervals, and receiving piggybacked time slot requests; and
the first device selects a different size of another contention region in response to the received communications.

30. The system of claim 29, the first device including a cable modem termination system (CMTS) and the set of second devices including cable modems.

31. The system of claim 29, wherein the first device selects the size of the contention regions based at least in part on a piggyback ratio, the piggyback ratio being a ratio of a number of piggybacked time slot requests relative to a total number of time slot requests.

32. The system of claim 29, wherein the first device selects the size of the contention regions based at least in part on an average packet size of packets received during previous grant regions.

33. The system of claim 29, wherein the first device selects the size of the contention regions based at least in part on a piggyback ratio and an average packet size, the piggyback ratio being a ratio of a number of piggybacked time slot requests relative to a total number of time slot requests.

34. The system of claim 33, wherein the first device selects the size of the contention regions approximately according to the following equation:

$$\frac{c}{\tau} \approx \frac{1}{1 + (0.368)(L)\left(\frac{1}{1-\beta}\right)},$$

wherein c is a number of contention slots in the contention regions, τ is a number of slots in the map intervals, L is the average packet size, and β is a piggyback ratio, the piggyback ratio being a ratio of a number of piggybacked time slot requests relative to a total number of time slot requests.

35. A method comprising:
selecting an initial backoff window for a time division multiple access (TDMA) system according to a size of a contention region of a map interval;
selecting a final backoff window for the TDMA system to be greater than or equal to an expected number of active downstream devices; and
transmitting the initial and final backoff windows to the set of downstream devices for use in upstream communication.

36. The method of claim 35, further comprising estimating the expected number of active downstream devices based at least in part on a collision ratio, the collision ratio being a proportion of time slots within one or more contention regions that contain collided time slot requests.

37. The method of claim 35, further comprising estimating the expected number of active downstream devices based at least in part on an empty ratio, the empty ratio being a proportion of time slots within one or more contention regions that contain no time slot requests.

38. The method of claim 35, further comprising estimating the expected number of active downstream devices based at least in part on a success ratio, the success ratio being a proportion of time slots within one or more contention regions that contain exactly one successful time slot request.

39. A device that controls upstream scheduling in a reservation-based time division multiple access (TDMA) system, the device being configured to:
select an initial backoff window for a time division multiple access (TDMA) system according to a size of a contention region of a map interval;
select a final backoff window for the TDMA system to be greater than or equal to an expected number of active downstream devices; and
transmit the initial and final backoff windows to the set of downstream devices for use in upstream communication.

* * * * *